United States Patent
Carasso (10) Patent No.: US 7,437,012 B2
(45) Date of Patent: Oct. 14, 2008

(54) SINGULAR INTEGRAL IMAGE DEBLURRING METHOD

(75) Inventor: Alfred S. Carasso, North Potomac, MD (US)

(73) Assignee: United States of America as represented by the Secretary of Commerce, The National Institute of Standards & Technology, Washington, DC (US)

( * ) Notice: Subject to any disclaimer, the term of this patent is extended or adjusted under 35 U.S.C. 154(b) by 722 days.

(21) Appl. No.: 10/928,308

(22) Filed: Aug. 30, 2004

(65) Prior Publication Data

US 2005/0041880 A1    Feb. 24, 2005

Related U.S. Application Data

(60) Provisional application No. 60/574,787, filed on May 27, 2004, provisional application No. 60/574,788, filed on May 27, 2004.

(51) Int. Cl.
*G06K 9/40* (2006.01)
(52) U.S. Cl. ................................. 382/255; 382/275
(58) Field of Classification Search ................ 382/255
See application file for complete search history.

(56) References Cited

U.S. PATENT DOCUMENTS

| | | | | |
|---|---|---|---|---|
| 4,903,204 A | * | 2/1990 | Dobbins, III | 382/255 |
| 5,414,782 A | * | 5/1995 | Carasso | 382/270 |
| 5,627,918 A | * | 5/1997 | Carasso | 382/254 |
| 7,187,413 B2 | * | 3/2007 | Alderson | 348/353 |
| 7,203,377 B2 | * | 4/2007 | Ludwig | 382/255 |
| 2004/0071363 A1 | * | 4/2004 | Kouri et al. | 382/276 |

OTHER PUBLICATIONS

*Novel Imaging Systems Rely on Focus-Free Optics*; Dana Mackenzie; SIAM News, Vol. 36, No. 6, Jul./Aug. 2003.
*Least Squares Methods for Ill-Posed Problems with a Prescribed Bound*; Keith Miller; SIAM J. Math. Anal., vol. 1, No. 1, Feb. 1970.
*Iterative Identification and Restoration of Images*; Reginald L. Lagendijk et al; NIST Library Catalog, 1991.
*Explicit Algorithms for a New Time Dependent Model Based on Level Set Motion for Nonlinear Deblurring and Noise Removal*; Antonio Marquina et al; Siam J. Sci. Comput.; vol. 22, No. 2, pp. 387-405, 2000.
*Are Natural Images of Bounded Variation?*; Yann Gousseau et al; Siam J. Math. Anal.; vol. 33, No. 3, pp. 634-648, 2001.
*Singular Integrals, Image Smoothness, and the Recovery of Texture in Image Deblurring*; Alfred S. Carasso; NISTIR 7005, Dec. 16, 2003.

(Continued)

*Primary Examiner*—Matthew C Bella
*Assistant Examiner*—Sath V. Perungavoor
(74) *Attorney, Agent, or Firm*—Novak Druce + Quigg LLP (57) ABSTRACT

The present invention provides a method for image deblurring based on correctly specifying the lack of smoothness in the unknown desired sharp image, in terms of Lipschitz (Besov) space classification. The method makes essential use of Singular Integrals and Fast Fourier Transform (FFT) algorithms to estimate the image's Lipschitz exponent $\alpha$. Such Singular Integrals and Fast Fourier Transforms are then used in a method for regularizing the ill-posed deblurring problem, resulting in a fast, direct, (i.e., non-iterative) computationally effective deblurring procedure.

16 Claims, 7 Drawing Sheets

L1 RELATIVE ERRORS IN 3 LEVY SINGULAR INTEGRAL APPROXIMATIONS

OTHER PUBLICATIONS

*A Direct Procedure for Classifying Image Smoothness, Based on Singular Integral Operators and Fast Fourier Transform Algorithms*; Alfred Carasso, Aug. 15, 2003.

*An Iterative Technique for the Rectification of Observed Distributions*; L. B. Lucy; The Astronomical Journal; vol. 79, No. 6, Jun. 1974.

*An Interation Formula for Fredholm Integral Equations of the First Kind*; L. Landweber; American Journal of Mathematics, vol. 73, No. 3 (Jul. 1951), 615-624.

*Maximum-entropy Restoration: Lagrange and Recursive Techniques*; Edward S. Meinel; The Aerospace Corporation; vol. 5, No.1/ Jan. 1988; J. Opt. Soc. Am. A., pp. 25-29.

*Linear and Nonlinear Image Deblurring: A Documented Study*; Alfred S. Carasso; Siam J. Number Anal., vol. 36, No. 6, pp. 1659-1689, 1999.

*Mathematical Methods in Medical Imaging II*; SPIE-The International Society for Optical Engineering; Jul. 15-16, 1993, San Diego, California; vol. 2036; Proceedings Reprint.

*The Apex Method in Image Sharpening and the Use of Low Exponent Levy Stable Laws*; Alfred S. Carasso; Siam J. Appl. Math.; vol. 63, No. 2, pp. 593-618, 2002.

*Direct Blind Deconvolution*; Alfred S. Carasso; Siam J. App. Math.; vol. 61, No. 6, pp. 1980-2007, 2001.

*APEX Method and Real-Time Blind Deconvolution of Scanning Electron Microscope Imagery*; A reprint from Optical Engineering; ISSN 0091-3286; Alfred S. Carasso et al; Opt. Eng. 41(10) 2499-2514 (Oct. 2002).

*Singular Integral Image Deblurring Methods. A Class of Fast, Direct (Non-Iterative) Methods That Recover Fine-Scale Strucure, Using Lipschitz (Besov) Space Regularization, Singular Integrals, and the Fast Fourier Transform*; Alfred S. Carasso; Sep. 25, 2003.

*Overcoming Holder Continuity in Ill-Posed Continuation Problems*; Alfred S. Carasso; Siam J. Math. Anal.; vol. 28, No. 3, pp. 656-668, May 1997.

*Error Bounds in Nonsmooth Image Deblurring*; Alfred S. Carasso; Siam J. Math. Anal.; vol. 28, No. 3, pp. 656-668, May 1997.

\* cited by examiner

SINGULAR INTEGRAL IMAGE DEBLURRING METHOD

REFERENCES TO RELATED APPLICATIONS

This application claims priority from U.S. Application Ser. No. 60/574,787 and from U.S. Application Ser. No. 60/574,788, both filed May 27, 2004, the contents of both of which are hereby incorporated by reference in their entirety.

BACKGROUND OF THE INVENTION

1. Field of the Invention

The present invention relates to a method for image de-blurring, based on estimating an image's Lipschitz exponent a using a direct computational technology rather than an iterative technique. More particularly, the method of the present invention is related to de-blurring of an image based on singular integrals and Fast Fourier Transform (FFT) algorithms.

2. Description of the Related Art

Most images $f(x, y)$ are not differentiable functions of the space variables x and y. Rather, they exhibit edges, singularities, localized sharp features, and various other kinds of important fine-scale details or texture. For such non-smooth imagery, prior art has generally formulated the ill-posed image-deblurring problem incorrectly. This often leads to flawed reconstructions, where vital small-scale information has been smoothed out, or where unexpected noise-induced graininess obscures fine detail.

Digital image acquisition plays an ever-increasing role in science, technology, and medicine, and image deblurring is becoming an increasingly important image processing activity. In addition, with the widespread use of digital cameras and camera cell-phones, there is growing general interest in the possibilities of post-processed digital image enhancement. In another direction, wavefront coding is a revolutionary new idea in Optics that calls for deliberately designing an imperfect lens, see, e.g., D. MacKenzie, *Novel Imaging Systems Rely On Focus-Free Optics*, SIAM News, Volume 36#6, July-August 2003, the contents of which are hereby incorporated by reference in their entirety. That lens produces a blurred image, but one where the depth of field has been significantly increased. Mathematical deconvolution is subsequently applied to the blurred image to remove the designed blur. This results in a superior photograph where distant and close-in objects are equally well focused. Carl Zeiss Inc., is reportedly set to manufacture such a lens. In these applications, fast computational throughput for large size imagery is very desirable. Some deconvolution methods involve computationally intensive nonlinear iterative procedures, typically requiring hours of computing time. Direct (non-iterative) deconvolution methods, that can process 1000×1000 images in less than a minute of computing time, are considered real-time methods, and are highly sought after.

Image deblurring is a difficult ill-posed mathematical problem, requiring for its correct solution prior knowledge and specification of the smoothness characteristics in the unknown exact sharp image $f(x, y)$. However, most commonly occurring images are not differentiable functions of the space variables x and y. Rather, these images display edges, localized sharp features, and various other fine-scale details or texture. For such non-smooth imagery, prior art has generally stabilized the ill-posed deblurring problem by prescribing $L^2$ bounds for the sharp image $f(x, y)$. The $L^2$-Tikhonov-Miller method, is the best-known example of that approach, see, e.g., K. Miller, *Least Squares Methods For Ill-Posed Problems With A Prescribed Bound*, SIAM J. Math. Anal., 1 (1970), pp 52-74; R. L. Lagendijk and J. Biemond, *Iterative Identification and Restoration of Images*, Kluwer Academic Publisher, Norwell, Mass., 1991, the contents of both of which are hereby incorporated in their entirety. In another direction, considerable research during the last ten years has been based on the assumption that images belong to $BV(R^2)$, the space of functions of bounded variation. This has led to nonlinear partial differential equation (PDE) deblurring procedures, where bounds are prescribed on the total variation or TV seminorm $$\int_{R^2} |\nabla f| dx dy.$$

The Marquina-Osher TV algorithm is one of the most widely used PDE deblurring methods, see, e.g., Marquina-Osher, *Explicit Algorithms For A New Time Dependent Model Based On Level Set Motions For Nonlinear Deblurring And Noise Removal*, SIAM J. Sci. Comput., 22 (2000), pp. 387-405, the contents of which are hereby incorporated in their entirety. However, each of these two general deblurring approaches is fundamentally flawed theoretically, and that flaw often translates into poor quality reconstructions. Thus, prescribing $L^2$ bounds insufficiently constrains the Tikhonov-Miller solution, which is typically found to be contaminated by noise. Also, as was recently proved, most natural images are not of bounded variation, see Y. Gousseau and J. M. Morel, *Are Natural Images of Bounded Variation?*, SIAM J. Math Anal., 33 (2001), pp. 634-648, the contents of which are hereby incorporated by reference in their entirety. As a result, Marquina-Osher TV deblurring often leads to unacceptable loss of fine-scale information.

Correct characterization and calibration of the lack of smoothness of images is crucial in image deblurring, as well as in other image processing tasks. As functions of x and y, most images are significantly better behaved than the most general $L^2$ functions, while being significantly less smooth than functions of bounded variation. For this reason, both the $L^2$-Tikhonov-Miller and TV-Marquina-Osher methods are incorrectly formulated.

SUMMARY OF THE INVENTION

Thus, a satisfactory solution to the deblurring problem is needed. The present invention solves the deblurring problem by providing a method for singular integral deblurring of images. Very recently it has become apparent that so-called Lipschitz spaces $\Lambda(\alpha, p, q)$, are the correct framework for image deblurring, see A. S. Carasso, *Singular Integrals, Image Smoothness, and The Recovery of Texture In Image Deblurring*, NISTIR #7005, June 2003, National Institute of Standards and Technology, Gaithersburg, Md. 20899 and A. S. Carasso, *Singular Integrals, Image Smoothness, and The Recovery of Texture In Image Deblurring*, SIAM J. Appl. Math., 64(2004), pp. 1749-1774. Such spaces describe functions with fractional derivatives, and can easily accommodate non-smooth images. The $L^p$ Lipschitz exponent $\alpha$, $0<\alpha<1$, measures the fine-scale content of an image, provided that image is relatively noise free. Heavily textured images have low values for $\alpha$, while a large value of a indicates that an image is relatively smooth. Estimating an image's Lipschitz exponent $\alpha$ is a delicate problem.

In the method of the present invention, image deblurring is treated as an entirely separate issue from image smoothness characterization. The present invention is based on a new and fundamental reformulation of the image deblurring problem in which the Lipschitz space characterization of the unknown desired sharp image $f(x, y)$ has been explicitly incorporated. This Lipschitz space characterization pertains to the space $\Lambda(\alpha, 2, \infty)$, and is expressed in terms of the singular integral (SI) method of the present invention, which is fully developed and discussed in *A Direct Procedure For Classifying Image Smoothness, Based On Singular Integral Operators and Fast Fourier Transform Algorithms*, Aug. 15, 2003, which is hereby incorporated by reference in its entirety. An entirely new energy functional is provided for the deblurring problem that is used to define the deblurred image. In this functional, Fourier analysis and singular integral operators play essential roles in specifying and enforcing the required Lipschitz space information.

The present invention is directed to a method for solving the image deblurring problem where one is given a noisy blurred image g(x, y), and a known shift-invariant point spread function p(x, y). Each of these is assumed to be a 2J×2J array of non-negative numbers, with the array p(x, y) summing to unity. This problem has the mathematical form $$p(x, y) \otimes f(x, y) = g(x, y), \quad (1)$$

where ⊗ denotes convolution. We may write $$g(x, y) = g_e(x, y) + n(x, y), \quad (2)$$

where $g_e(x, y)$ is the hypothetical exact blurred image that would have been recorded in the absence of any noise, and n(x, y) presumed small, represents the cumulative effects of all noise processes and other errors affecting final acquisition of the digitized array g(x, y). The noise may be multiplicative. Neither $g_e(x, y)$ nor n(x, y) are known, and only their sum g(x, y) is known. Denoting the unknown exact sharp image by $f_e(x, y)$, we have $$p(x, y) \otimes f_e(x, y) = g_e(x, y), \quad 0 \leq f_e(x, y) \leq MAX. \quad (3)$$

Note that blurring is an averaging process that reduces maximum image intensity. Hence, we necessarily have $0 \leq g_e(x, y) < MAX$ in Eq. (3), if MAX represents the actual maximum pixel value in the sharp image $f_e(x, y)$. The fundamental difficulty in deblurring is due to the fact that g(x, y) is given, not $g_e(x, y)$. Thus, one must solve Eq.(1), rather than Eq.(3). Because of the notorious ill-conditioned nature of that problem, special precautions are necessary to find a solution $f(x, y)$ in Eq.(1) that is a good approximation to the correct solution $f_e(x, y)$ in Eq.(3). A-priori information about $f_e(x, y)$ and n(x, y) is an essential element in the successful solution of Eq.(1).

For any 2J×2J array i(x, y), define the discrete $L^2$ norm of i(x, y) as follows $$\|i\|_2 \equiv \left\{ \sum_{x,y=1}^{2J} |i(x, y)|^2 \right\}^{1/2} \quad (4)$$

Denote the forward discrete Fourier transforms of the 2J×2J arrays p(x, y) and g(x, y), by $\hat{p}(\xi, \eta)$ and $\hat{g}(\xi, \eta)$, respectively, where ξ, η are integers and $-J \leq \xi, \eta \leq J$. These discrete Fourier transforms can be computed using Fast Fourier Transform (FFT) algorithms.

This invention is a direct non-iterative deblurring method, capable of restoring images of size 1024×1024 in seconds of CPU time. The method is therefore useable in real-time applications in such fields as Astronomy, Electron Microscopy, and Medicine. The prior art Lucy-Richardson, Van Cittert, Landweber, Maximum Entropy, and related methods, are examples of iterative methods, see, respectively, {L. B. Lucy, *An Iterative Technique For The Rectification of Observed Distributions*, Astronomical Journal, 79 (1974), pp. 745-754; R. L. Lagendijk and J. Biemond, *Iterative Identification and Restoration of Images*, Kluwer Academic Publishers, Norwell, Mass., 1991; L. Landweber, *An Iteration Formula For Fredholm Integral Equations Of The First Kind*, Am. J. Math., 73 (1951), pp. 615-624; and E. S. Meinel, *Maximum Entropy Image Restoration: Lagrangian and Recursive Techniques*, J. Opt. Soc. Amer. Series A, 5 (1988), pp. 25.29} the respective contents of which are hereby incorporated in their entirety. These methods typically require several thousand iterations to resolve fine detail, and necessitate several hours of CPU time for large size imagery. Such methods are not useable in real-time applications. Accordingly, iterative methods are not considered relevant prior art for the present invention, and are not discussed further. However, a survey and evaluation of the merits and shortcomings of these iterative methods is given in A. S. Carasso, *Linear and Non-linear Image Deblurring: A Documented Study*, SIAM J. Numer. Anal., 36(1999), pp. 1659-1689, the contents of which are hereby incorporated by reference in their entirety.

The prior art true Wiener filtering method requires a-priori knowledge of the exact power spectra of both the unknown desired sharp image $f_e(x, y)$ and the noise component n(x, y), i.e., the quantities $|\hat{f}_e(\xi,\eta)|$, and $|\hat{n}(\xi,\eta)|$, for $-J \leq \xi, \eta \leq J$. This represents a total of $8J^2$ numbers. That information is almost never available in practice, and true Wiener filtering is unrealizable, except in controlled numerical experiments. However, the method is of considerable theoretical interest because it provides the mathematically optimal deblurred image, i.e., that image whose departure from $f_e(x, y)$ is the smallest in the $L^2$ norm. Examples of True Wiener filtering are included in each of FIGS. 5, 6, and 7, for comparison purposes.

The prior art Tikhonov-Miller method requires a-priori knowledge of positive constants E and M, such that $$\|n\|_2 \leq \epsilon, \|f\|_2 \leq M, \epsilon << M. \quad (5)$$

The Tikhonov-Miller method is considered to be a realizable approximate version of the unrealizable true Wiener method, requiring only two a-priori numbers, versus $8J^2$. The resulting deblurred image may be far from optimal, however. In fact, the quality of the Tikhonov-Miller image is usually much inferior to that of the true Wiener image. An example of Tikhonov-Miller deblurring is included in FIG. 5. The prior art Total Variation or TV method assumes the unknown sharp image $f_e(x, y)$ to be of bounded variation, and requires knowledge of positive constants $\epsilon$ and $K_{TV}$, such that $$\|n\|_2 \leq \epsilon, \int_{R^2} |\nabla f_e(x, y)| dx dy \leq K_{TV} \quad (6)$$

The TV method is currently very much in vogue. The method is computationally intensive, and is typically implemented by numerically solving a nonlinear partial differential equation of anisotropic diffusion type. The great strength of this method is its ability to filter out noise while preserving edges. However, a very major disadvantage of the TV method is its tendency to eliminate vital small-scale information, unbeknownst to the user. In fact, the method is based on a mathematically false premise. Most natural images are not of bounded variation, and the true value of the constant $K_{TV}$ in Eq. (6) is infinite. Any implementation of TV deblurring must use a finite value for $K_{TV}$. This can lead to unacceptable smoothing out of texture and other fine detail. Examples of TV deblurring are included in FIGS. 6 and 7.

The Singular Integral or SI method of the present invention is a direct, non-iterative method requiring only four a-priori numbers. Nevertheless, the SI method consistently delivers deblurred imagery that is quite close in quality to that found in unrealizable, true Wiener filtering. In particular, the SI method avoids the noise-induced graininess that is typical in the prior art Tikhonov-Miller method, as well as the unacceptable loss of texture that is generally found in the prior art Total Variation (TV) method.

No role is played in the method of the present invention by any of multi-resolution analysis, wavelet theory, wavelet expansions, decay of wavelet coefficients, image compression, or image quantization, and no knowledge whatsoever of any of these topics is required to implement the present approach computationally. In fact, very modest computational effort is actually necessary to implement the Lipschitz space deblurring method of the present invention that is based on new energy functional $\pi(f, \lambda)$. The desired deblurred images is the unique function $f^{SI}(x, y)$ that minimizes $\pi(f, \lambda)$ over all $f \in L^2$. Commonly available FFT algorithms can be used to construct $f^{SI}(x, y)$ directly and this results in the fast direct deblurring method of the present invention. Note that use of the energy functional $\pi(f, \lambda)$. requires specifying a value of $\lambda$, where $0 < \lambda \leq 1$. Each choice of $\lambda$ translates into a specific choice of singular integral semigroup $S_\lambda^t$. The choice of singular integral operator becomes the one that is used both for classifying image smoothness, and for regularizing the ill-posed deblurring problem. Therefore, each choice of $\lambda$ defines an instantiation of the functional $\pi(f, \lambda)$ as the concrete, correctly formulated, Lipschitz space image deblurring method of the present invention. Because of the multiplicity of distinct values of $\lambda$ that can be used, an entire class of image deblurring methods is actualy subsumed under the umbrella of the functional $\pi(f, \lambda)$, through the family $S_\lambda^t$. The present invention therefore includes the infinitely many distinct methods defined by the family $S_\lambda^t$, $0 < \lambda \leq 1.0$.

In experiments conducted using the method of the present invention, the particular choice $\lambda = 0.5$ was made, corresponding to the Poisson Singular Integral. However, similar results can be obtained with other choices of $\lambda$.

DETAILED DESCRIPTION

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

The present invention is directed to a two-part image deblurring method having a classification module for classifying image smoothness and an image deblurring module, that are both based on singular integral operators and Fast Fourier Transform algorithms. Given a square image $f(x, y)$, the present invention includes a first method for determining a Lipschitz exponent a of the square image, for a particular user-selected $L^p$ norm. This determination implies that the given image belongs to a specific Lipschitz space $\Lambda(\alpha, p, \infty)$. In addition, for a specific user-selected choice of singular integral operator $S_\lambda^t$, the image classifying method determines a positive constant C such that $$\|S_\lambda^t f - f\|_p \leq C \|f\|_p t^{\alpha/2\lambda} \quad 0 < t \leq 0.1. \tag{7}$$

When p=2, the information contained in Eq.(7) is the basis for a singular integral image deblurring method associated with the operator $S_\lambda^t$.

The first module is a classification module comprising the steps of:

1. Given a noise-free 2J×2J image $f(x, y)$, applying commonly available Fast Fourier Transform Algorithms to form the forward Fourier Transform of $f(x, y)$, denoted by $\hat{f}(\xi, \eta)$, where $\xi$ and $\eta$ are integers and $-J \leq \xi, \eta \leq J$.

2. For a preselected fixed value of $\lambda$, where $0.5 \leq \lambda \leq 1$, and a preselected fixed finite sequence $\{t_n\}_{n=1}^N$ tending to zero, forming the function $\hat{g}_\lambda(\xi, \eta, t_n)$ for each $t_n$, where $$\hat{g}_\lambda(\xi, \eta, t_n) = e^{-t_n(\xi^2 + \eta^2)^\lambda} \hat{f}(\xi, \eta) \tag{8}$$

The Poisson singular integral, denoted by $U^t$, corresponds to the choice $\lambda = 0.5$ in Eq.(8), while the Gaussian singular integral, denoted by $G^t$, corresponds to $\lambda = 1.0$. Other values of $\lambda$ correspond to more general isotropic Levy stable singular integrals denoted by $S_\lambda^t$. Values of $\lambda < 0.5$ are generally less useful in this method. For a wide class of 512×512 and 1024×1024 8-bit images, the sequence $t_n = (0.95)^n$, n=1, ..., 300, has been found adequate.

3. For each $t_n$, using FFT algorithms to form the inverse Fourier transform of $\hat{g}_\lambda(\xi, \eta, t_n)$ denoted by $g_\lambda(x, y, t_n)$. In the function $g_\lambda(x, y, t_n)$, all negative values are reset to the value zero. It is not necessary to display the image corresponding to $g_\lambda(x, y, t_n)$. However, that image would be a blurred version of the original image $f(x, y)$. For each $t_n$ let $h_n(x, y)$ denote the difference between $f(x, y)$ and $g_{\lambda(x, y, tn)}$, $$h_n(x, y) = f(x, y) - g_\lambda(x, y, t_n) \tag{9}$$

4. For any 2J×2J image i(x, y), and any integer $p \geq 1$, defining the discrete $L^p$ norm of i(x, y), as follows $$\|i\|_p \equiv \left\{ \sum_{x,y=1}^{2J} |i(x, y)|^p \right\}^{1/p} \tag{10}$$

where the values p=1 and p=2 are of particular interest.

5. For a predetermined value of p, calculating the positive number $\|f\|_p$, for the given image $f(x, y)$.

6. For each $t_n$, calculating the finite sequence $\{\mu(t_n)\}_{n=1}^{N}$ where $$\mu(t_n) = \|h_n(x,y)\|_p / \|f\|_p,$$

and where $h_n(x, y)$ is defined in Eq.(9). Note that steps 2,-6 can be performed simultaneously, for numerous distinct $t_n$ values, on multiprocessor computers. Such parallel computation of $\mu(t_n)$ becomes advantageous for large size imagery.

Figure 1:
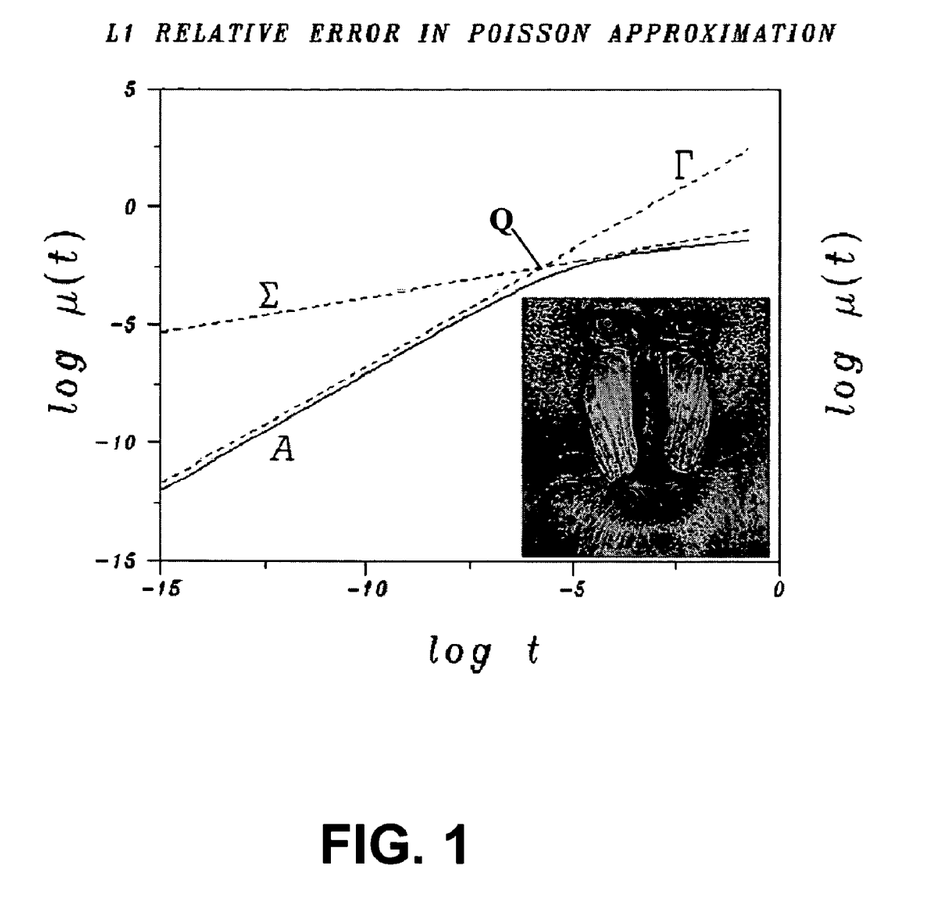
FIG. 1 illustrates Lipschitz exponent determination for a 512×512 Mandrill image.

7. Plotting ln $\mu(t_n)$ v. ln $(t_n)$ for n=1, ..., N.

An example of the resulting curve is illustrated in FIG. 1 for p=1 and a 512×512 Mandrill image, with λ=0.5 (Poisson kernel).

In FIG. 1, Lipschitz exponent determination is illustrated for a 512×512 Mandrill image, using Poisson singular integral $U^t$(λ=0.5). Solid curve A is a plot of $\mu(t) = \|U^t f - f\|_1 / \|f\|_1$, versus t, on a log-log scale. Majorizing dashed straight line Γ, defined by ln $\mu(t) = 3.2 + 0.994$ ln t, accurately captures linear behavior in $\mu(t)$ for very small values of t, but is grossly inaccurate at larger values of t. Such linear behavior at very small t is misleading and is disregarded in determining a Lipschitz exponent. Majorizing dashed straight line Σ, defined by ln $\mu(t) = -0.75 + 0.306$ ln t, accurately reflects behavior for $-6 \leq \ln t \leq -1$, while being grossly inaccurate at very small t. Slope σ>0 of line Σ actually determines Lipschitz exponent a through α=2σλ. These results imply that Mandrill image $\in \Lambda(0.306, 1, \infty)$ with $\|U^t f - f\|_1 \leq 0.472 \|f\|_1 t^{0.306}$, $0 < t \leq 0.1$.

Figure 2:
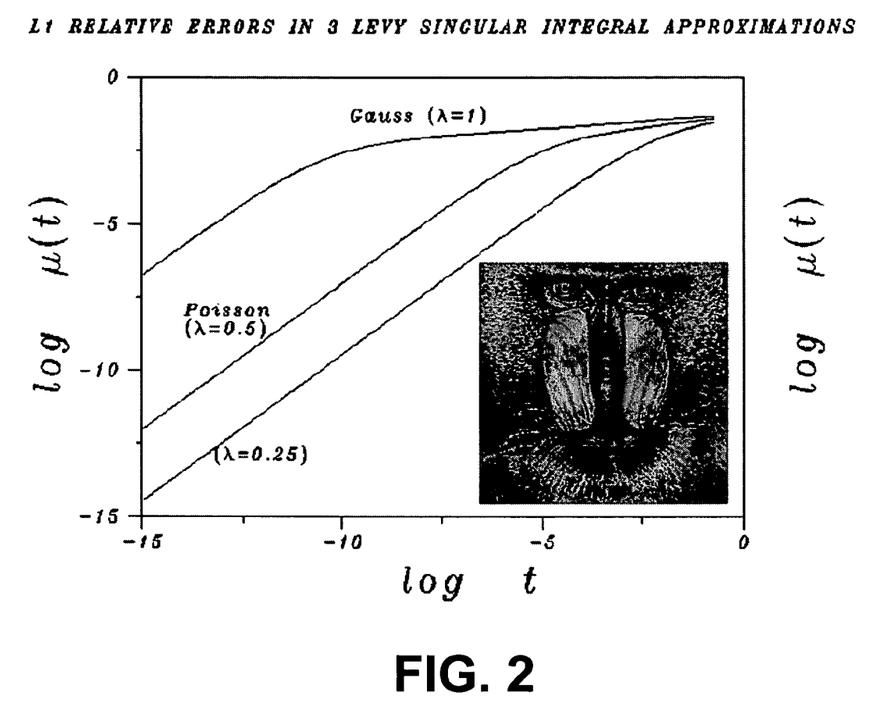
FIG. 2, for the same image, illustrates curves corresponding to the choices $\lambda = 0.25$ and $\lambda = 1.0$ (Gauss kernel) and the Poisson curve ($\lambda = 0.5$).

In FIG. 2, for the same image, curves corresponding to the choices λ=0.25 and λ=1.0 (Gauss kernel), are compared with the Poisson curve (λ=0.5). Here, this is done solely for the purpose of illustrating behavior at various values of λ. The methodology requires a single choice of λ, and a single curve.

In fact, an infinite variety of singular kernels can be applied to estimate image Lipschitz exponents a. General radially symmetric Levy stable singular operators $S_\lambda^t$, include Gaussian kernels (λ=1.0), and Poisson kernels (λ=0.5), as special cases. Referring now to FIG. 2, the curves display $\mu(t)$ versus t, on a log-log scale, for Mandrill image, with $\mu(t) = \|S_\lambda^t f - f\|_1 / \|f\|_1$, for three distinct values of B. All three curves begin as straight lines with slope≈1 at very small values of t, and then flatten out into 'slowly increasing' portions. Linear portion is excluded when estimating α, and only 'slowly increasing' portion of each curve is useful. This useful portion becomes too small for analysis when λ<<0.5. Lipschitz exponent a determined from α=2σλ, where σ>0 is slope of straight line that best-fits slowly increasing portion. For images in FIG. 3, use of the Gaussian kernel and least squares fits on $-11.5 \leq \ln t \leq -1.0$, produces α estimates closely matching those obtained in TABLE 1, using the Poisson kernel and least squares fits on $-6.0 \leq \ln t \leq -1.0$.

Figure 3:
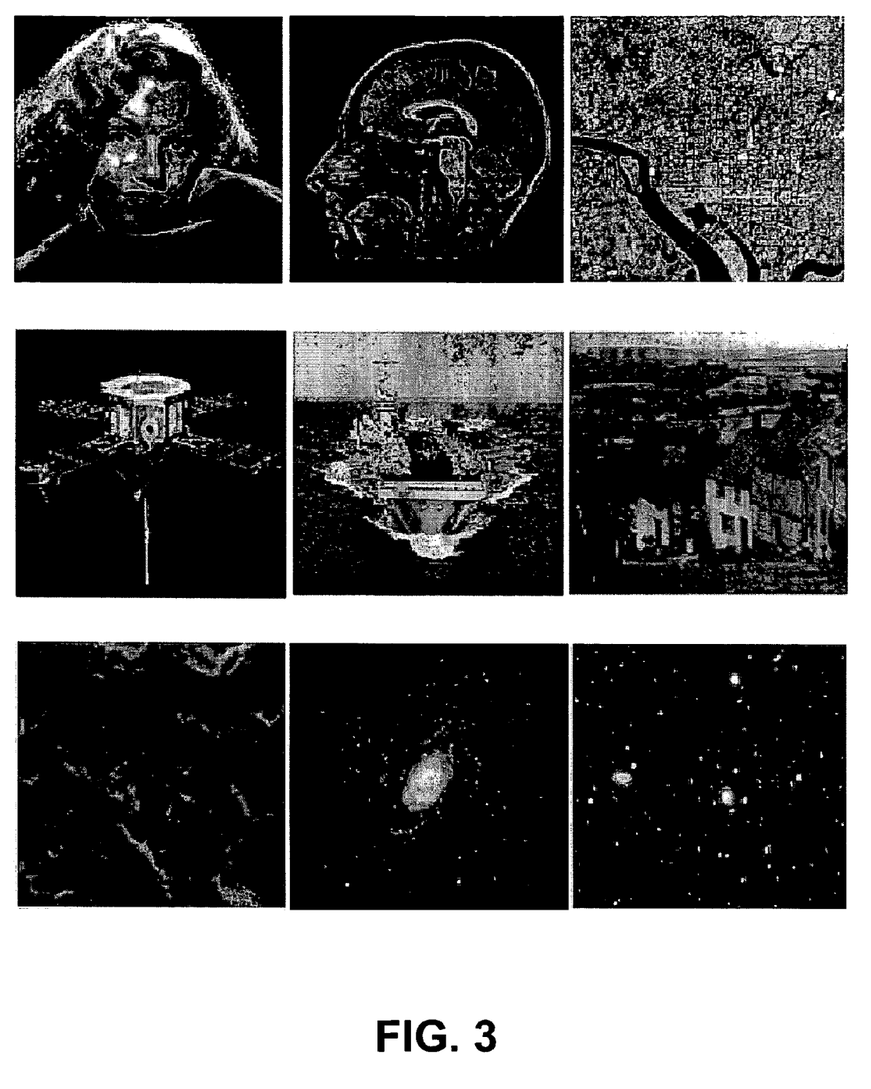
FIG. 3 illustrates a significant class of high-resolution 8-bit images having Lipschitz exponents $\alpha$ in the range $0.2 < \alpha < 0.7$, in either $L^2$ or $L^2$.

FIG. 3 illustrates a significant class of high-resolution 8-bit images that have Lipschitz exponents α in the range 0.2<α<0.7, in either $L^1$ or $L^2$.

8. Characteristic of the solid curves in FIGS. 1 and 2, is the occurrence of two distinct portions. The first portion, beginning at ln t=-15 and often ex-tending to ln t=-10 and beyond, is a straight line (or very nearly so) with slope ≈1.0. This straight line begins to moderate in slope, and gradually flattens out into a slowly increasing curve, which constitutes the second portion. That slowly increasing second portion plays a crucial role in the present invention, and typically lies between $-6.0 \leq \ln t \leq -1.0$ when λ=0.5, and between $-11.5 \leq \ln t \leq -1.0$ when λ=1.0. As is evident from FIG. 2, when), <<0.5, this vital slowly increasing portion is usually too small for subsequent analysis. The image Lipschitz exponent a is determined from α=2σλ, where σ>0 is the slope of the straight line that best-fits this slowly increasing second portion in the sense of least squares.

9. Using commonly available Linear Least Squares algorithms to find the straight lines Γ and Σ, as shown in FIG. 1, as follows. Let $v_n = \ln \mu(t_n)$, and let $u_n = \ln t_n$. For $-15 \leq u_n \leq -12$, fit $v_n$ with $cu_n + d$. This will return c≈1.0, and a d value. The line Γ is defined to be the straight line v=cu+d+ε, with ε>0 chosen so that Γ lies slightly above the solid curve A for very small values of t. The line Γ is used to identify the slowly increasing second portion of A, as that portion substantially departs from Γ. The line Γ plays no further role. For $-6.0 \leq u_n \leq -1.0$, fit $v_n$ with $\sigma u_n + b$. (When the slowly increasing portion extends over a larger interval, that larger interval should be used). The line Σ is defined to be the straight line v=σu+b+δ, with δ>0 chosen so that Σ lies slightly above the slowly increasing second portion.

10. For the preselected specific value of p, the returned values for σ, b, and δ in step 9, yield the Lipschitz exponent α through $$\alpha = 2\sigma\lambda \quad (12)$$

as well as the important inequality $$\|S_\lambda^t f - f\|_p \leq C \|f\|_p t^\alpha, \quad 0 < t \leq 0.1, \quad (13)$$

where $$C = \exp(b + \delta). \quad (14)$$

This implies that $f(x, y)$ belongs to $\Lambda(\alpha, p, \infty)$. When p=2, the values of C and σ in Eq.(13) represent important a-priori information about the image $f(x, y)$ that can be used to reconstruct $f(x, y)$ from a noisy blurred version g(x, y).

NOTE: The choice of sequence $\{t_n\}$, and the preferred intervals for the least squares fits mentioned above, have been found to work well for a wide class of 8-bit images. However, it should be expected and understood by those skilled in the art that some modification of these parameters may be necessary to accommodate other types of images.

CLASSIFICATION EXAMPLES

FIG. 3 and TABLE 1 provide illustrative values for C and α, with p=1, 2, for some important types of sharp images. These results were obtained using the Poisson singular integral $U^t$. Significantly, for this diverse collection of images that encompasses objects exhibiting a very wide range of scales, the values of C and α are confined to a narrow range. Given only a blurred image g(x, y), such a narrow range of values makes it possible to estimate plausible values for (C, α), in the unknown desired sharp image $f(x, y)$ corresponding to g(x, y).

TABLE 1

Values of (C, α) in $\|U^t f - f\|_p \leq C \|f\|_p t^\alpha$, $0 < t \leq 0.1$, p = 1, 2, for each image f(x, y) in FIG. 3, when $U^t$ is Poisson integral operator

| Image | Size | (C, α) ∈ Λ(α, 1, ∞) | (C, α) ∈ Λ(α, 2, ∞) |
|---|---|---|---|
| Marilyn Monroe | $512^2$ | C = 0.77, α = 0.565 | C = 0.68, α = 0.474 |
| Sagittal brain MRI | $512^2$ | C = 1.28, α = 0.590 | C = 1.02, α = 0.520 |
| Washington DC Landsat | $512^2$ | C = 0.45, α = 0.341 | C = 0.55, α = 0.340 |
| Mariner 5 spacecraft | $512^2$ | C = 0.90, α = 0.448 | C = 0.99, α = 0.417 |
| USS Eisenhower | $512^2$ | C = 0.47, α = 0.420 | C = 0.50, α = 0.362 |
| English Village | $512^2$ | C = 0.49, α = 0.472 | C = 0.55, α = 0.439 |
| Nanoscale micrograph | $1024^2$ | C = 0.45, α = 0.415 | C = 0.55, α = 0.415 |
| Spiral galaxy M81 | $1024^2$ | C = 0.68, α = 0.365 | C = 0.78, α = 0.327 |

TABLE 1-continued

Values of (C, α) in $\|U^t f - f\|_p \leq C \|f\|_p t^\alpha$, $0 < t \leq 0.1$,
p = 1, 2, for each image f(x, y) in FIG. 3,
when $U^t$ is Poisson integral operator

| Image | Size | (C, α) ∈ Λ(α, 1, ∞) | (C, α) ∈ Λ(α, 2, ∞) |
|---|---|---|---|
| Cluster of galaxies | $1024^2$ | C = 0.65, α = 0.222 | C = 0.97, α = 0.216 |

Figure 4:
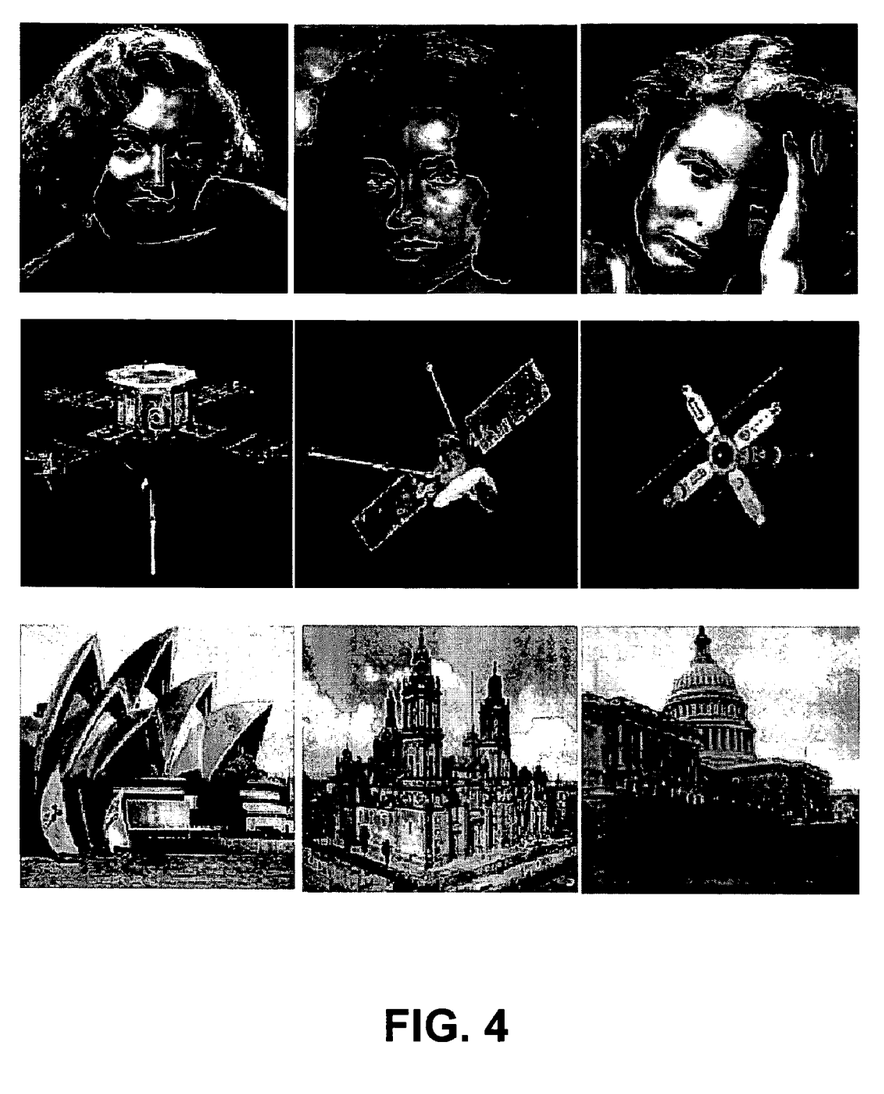
FIG. 4 illustrates images of 'similar' objects having approximately equal (C,$\alpha$) values.

Each row of images in FIG. 4 is of 'similar' objects. TABLE 2 provides the

TABLE 2

Values of (C, α) in $\|U^t f - f\|_2 \leq C \|f\|_2 t^\alpha$, $0 < t \leq 0.1$, for each
image f(x, y) in FIG. 4, when $U^t$ is Poisson integral operator

| Image | Size | (C, α) ∈ Λ(α, 2, ∞) |
|---|---|---|
| Marilyn Monroe | $512^2$ | C = 0.68, α = 0.474 |
| Elizabeth Taylor | $512^2$ | C = 0.76, α = 0.552 |
| Ingrid Bergman | $512^2$ | C = 0.67, α = 0.557 |
| Mariner 5 spacecraft | $512^2$ | C = 0.99, α = 0.417 |
| Mariner 10 spacecraft | $512^2$ | C = 1.25, α = 0.396 |
| USAF satellite | $512^2$ | C = 1.44, α = 0.459 |
| Sydney Opera House | $512^2$ | C = 0.51, α = 0.427 |
| Mexico City Cathedral | $512^2$ | C = 0.55, α = 0.395 |
| US Capitol | $512^2$ | C = 0.46, α = 0.470 | corresponding (C, α) values in the $L^2$ norm, for the Poisson singular integral $U^t$. Images of similar objects tend to have approximately equal values for (C,α). Hence, given a blurred Elizabeth Taylor image, in a preferred embodiment of the present invention, one can use (C, α) values corresponding to a sharp Marilyn Monroe image as a-priori information in a deblurring method according to the present invention. More generally, extensive databases of (C, α) values for sharp, noise-free images of similar objects, are a powerful tool in applications such as diagnostic medical imaging, surveillance, environmental monitoring, and several areas of non-destructive evaluation.

The second module is a deblurring module comprising the steps of

1. The first two a-priori numbers in the Singular Integral method are the positive constants ε and M in Eq.(5), just as in the Tikhonov-Miller method. The SI method assumes that the unknown exact sharp image $f_e(x, y)$ belongs to the Lipschitz space Λ(α, 2, ∞). The first step is choosing singular integral operator SA and positive constants C and α with α<1, such that $$\|S^t_{\lambda} f_e - f_e\|_2 \leq C\|f\|_2 t^{\alpha/2\lambda}, 0 < t \leq t^*. \quad (15)$$

Typical choices are t*=0.1, and λ=0.5, corresponding to the Poisson Singular Integral (PSI) method, or λ=1.0, corresponding to the Gaussian Singular Integral (GSI) method. Since infinitely many distinct choices of λ are possible, the SI method actually encompasses an entire class consisting of infinitely many distinct methods. However, with fixed λ and t*, the required a-priori information in the SI method consists of the four constants {ε, M, C, α}. Examples of pairs (C, α) for diverse images when λ=0.5 and t*=0.1, are given in Tables 1 and 2. The values of C and α are confined to fairly narrow ranges for a wide class of images, and plausible guesses for (C, α) are generally possible.

2. For integer ξ, η, with −J≦ξ, η≦J, let ρ=$(\xi^2+\eta^2)^\lambda$. With t*>0 as Eq. (15), defining $\hat{z}(\xi, \eta, \lambda, t^*)$ by $$\hat{z}(\xi, \eta, \lambda, t^*) = t^* + \left\{\frac{4e^{-t^*\rho} - e^{-2t^*\rho} - 3}{2\rho}\right\}^{1/2}, \quad -J \leq \xi, \eta \leq J \quad (16)$$

3. Next, with the given pair (C, α), let δ=α/(2λ), and defining the positive constant $\Gamma_{t^*}$ by $$\Gamma_{t^*} = \left\{\frac{1 + 2\delta}{C^2(t^*)^{1+2\delta}}\right\}^{1/2}, \delta = \alpha/(2\lambda). \quad (17)$$

4. Using the given pair (ε, M) in Eq. (5), and using the discrete forward Fourier transforms $\hat{g}(\xi, \eta)$ and $\hat{p}(\xi, \eta)$ of g(x, y) and p(x, y) respectively, forming the Fourier domain function $\hat{f}^{SI}(\xi, \eta)$ defined by $$\hat{f}^{SI}(\xi, \eta) = \frac{\overline{\hat{p}}(\xi, \eta)\hat{g}(\xi, \eta)}{|\hat{p}(\xi, \eta)|^2 + (\varepsilon/M)^2\{1 + \Gamma^2_{t^*}|\hat{z}(\xi, \eta, \lambda, t^*)|^2\}}, -J \leq \xi, \eta \leq J \quad (18)$$

In Eq. (18), $\overline{\hat{p}}(\xi, \eta)$ denotes the complex conjugate of $\hat{p}(\xi, \eta)$.

5. Using Fast Fourier Transform routines, forming the Inverse Fourier Transform of $\hat{f}SI(\xi, \eta)$ in Eq. (18). Reset any negative pixel value to the value zero. With the constant MAX as in Eq. (3), reset any pixel value exceeding MAX to the value MAX. The resulting function, denoted by $f^{SI}(x, y)$ is defined to be the Singular Integral deblurred image.

Figure 5:
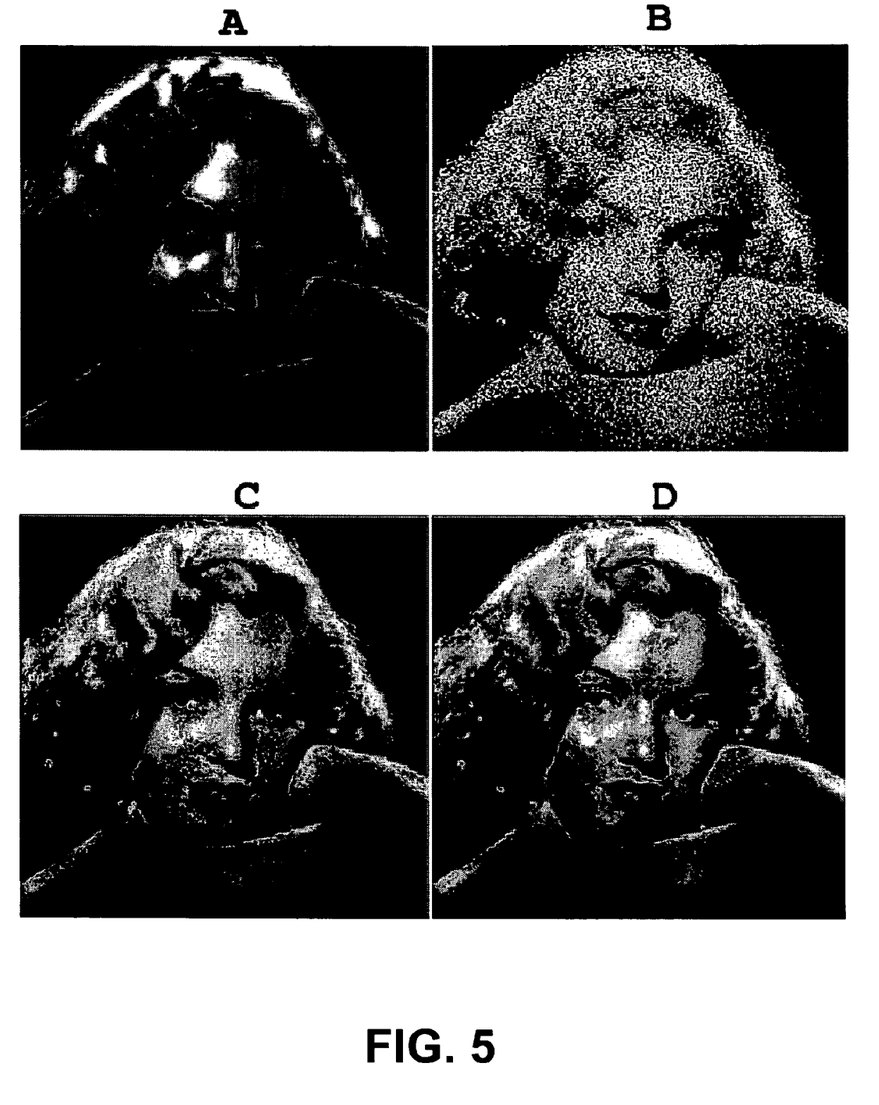
FIG. 5 illustrates a comparison of the SI method of the present invention with the Tikhonov-Miller method.
Figure 6:
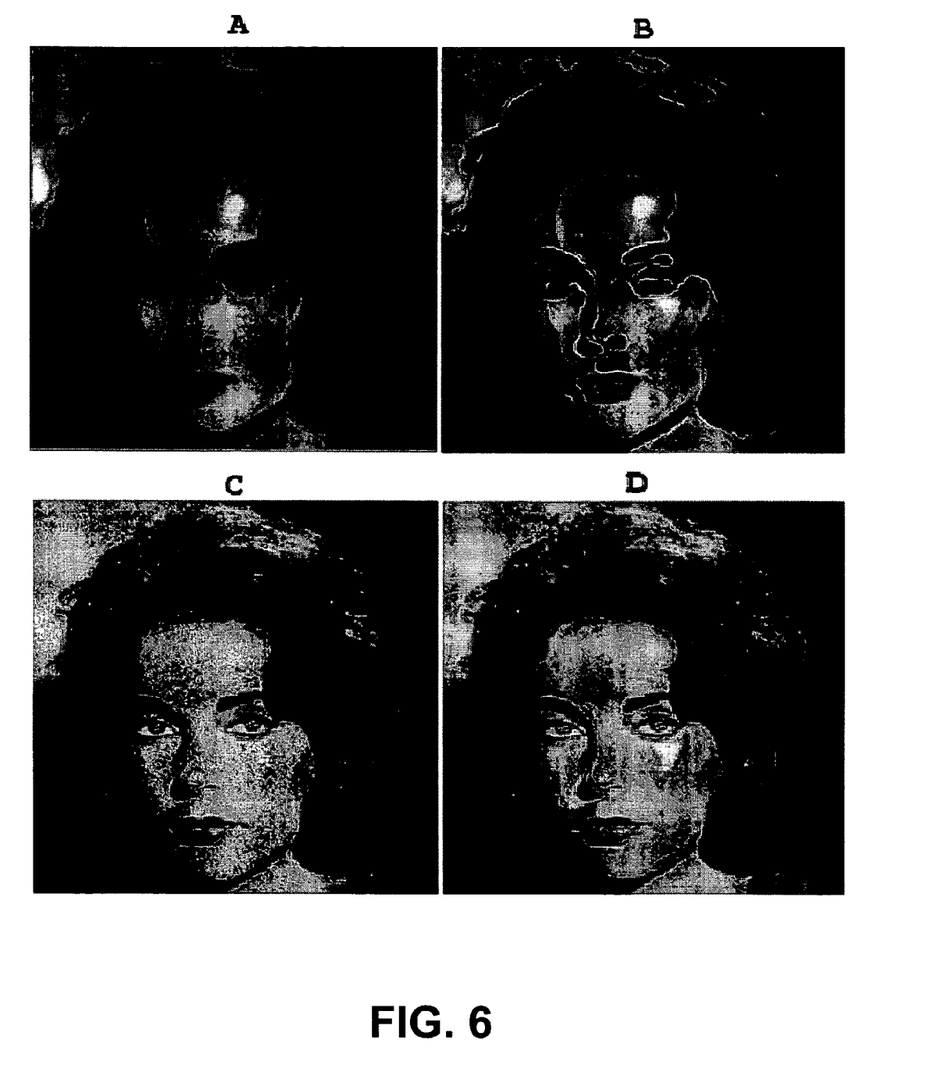
FIG. 6 illustrates a comparison of the SI method of the present invention with the Total Variation (TV) method.
Figure 7:
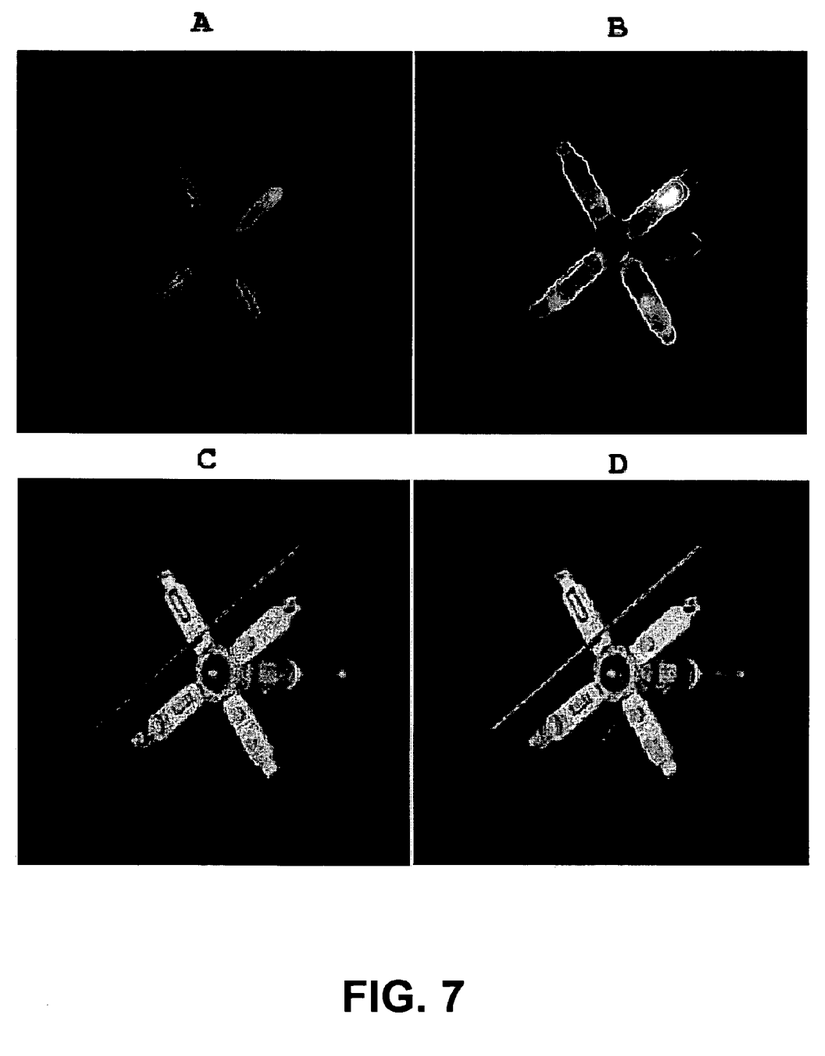
FIG. 7 illustrates the successful use of fictitious Lipschitz data derived from an object 'similar' to the image being deblurred.

6. Using commonly available software visualization tools, displaying $f^{SI}(x, y)$ on a computer screen or other imaging device. Examples of successful SI restorations are shown in FIGS. 5, 6, and 7.

7. Creating multiple trial reconstructions. The exact a-priori Lipschitz space information (C, α) may not be available for a given image. However, as shown in TABLES 1 and 2, values of C and α are confined to a fairly narrow range for a diverse class of images. Moreover, similar objects often have approximately equal (C, α) values for fixed λ and t*. Useful databases of (C, α) values for various classes of objects can therefore be compiled. In FIG. 7, the Poisson Singular Integral reconstruction of the blurred USAF satellite image, was accomplished using the (C, α) values for a 'similar' object, namely the Mariner 5 image discussed in the first invention. If need be, such an initial PSI reconstruction may be further refined.

Starting from an informed, plausible, initial guess for (C, α), it is feasible and helpful to explore computationally the effects of varying the values of C and α. This is achieved by simply varying the constant $\Gamma_{t^*}$ in Eq. (18). With fixed λ and t*, each choice of pair (C, α) defines a new constant $\Gamma_{t^*}$ in Eq. (17). With the stored pre-computed arrays $\hat{p}(\xi,\eta)$, $\hat{g}(\xi, \eta)$, and $\hat{z}(\xi,\eta,\lambda,t^*)$, multiple Fourier domain functions $\hat{f}^{SI}(\xi,\eta)$ can be generated in Eq. (18), corresponding to multiple constants $\Gamma_{t^*}$. Parallel computation, if available, may be used to generate and invert the multiple Fourier domain functions $\hat{f}^{SI}(\xi, \eta)$. Thus, steps 4 and 5 of the SI method, which constitute the heart of the SI method, can be done in parallel. However, it should be noted that computation of these multiple SI reconstructions is also quite easily accomplished on sequential machines. Visual inspection of the multiplicity of reconstructions, together with some prior knowledge of expected salient features in the exact solution $f_e(x, y)$, can guide the user towards selecting the best Singular Integral restoration.

Deblurring Examples

FIG. 5 illustrates a comparison of the results of the method of the present invention with the results of the prior art Tikhonov-Miller method. The realizable SI method of the present invention greatly improves on prior art, and closely matches unrealizable, optimal true Wiener image. (A) is a noisy defocused Marilyn Monroe image. (B) is the result of the Tikhonov-Miller method with exact parameters $\epsilon=2.25$ and M=131, which brings out significant noise. (C) is the result of Poisson Singular Integral ($\lambda=\frac{1}{2}$) method with exact parameters $\epsilon$, M, $\alpha=0.474$, $C_{f^*}=0.68$, $t^*=0.1$. (D) is a result using true Wiener filtering with exact power spectra $|\hat{n}(\xi, \eta)|$, $|\hat{f}_e(\xi, \eta)|$.

TABLE 3

Behavior in defocused Marilyn Monroe image in FIG. 5.

| Deblurring Method | $L^1$ relative error | $L^2$ relative error |
|---|---|---|
| Tikhonov-Miller (B) | 29.82% | 34.17% |
| Poisson Singular Integral (C) | 6.89% | 9.04% |
| True Wiener Filtering (D) | 6.03% | 7.88% |

FIG. 6 illustrates a comparison with total variation method. A realizable singular integral method greatly improves on prior art, and closely matches unrealizable, optimal true Wiener image. (A) Noisy defocused Elizabeth Taylor image. (B) Total Variation deblurring leads to lifeless, mannequin-like appearance. (C) Poisson Singular Integral ($\lambda=\frac{1}{2}$) method with exact parameters $\epsilon$, M, $\alpha=0.552$, $C_{f^*}=0.76$, $t^*=0.1$. (D) Unrealizable true Wiener filtering with exact power spectra $|\hat{n}(\xi, \eta)|$, $|\hat{f}_e(\xi, \eta)|$.

TABLE 4

Behavior in defocused Elizabeth Taylor image in FIG. 6.

| Deblurring Method | $L^1$ relative error | $L^2$ relative error |
|---|---|---|
| Total Variation (B) | 7.11% | 9.46% |
| Poisson Singular Integral (C) | 5.00% | 5.55% |
| True Wiener Filtering (D) | 2.55% | 2.66% |

FIG. 7. illustrates the use of fictitious Lipschitz data derived from 'similar' objects. The SI method of the present invention greatly improves on the prior art Total Variation method, and closely matches unrealizable, optimal true Wiener image. (A) is a strongly defocused noisy United States Air Force (USAF) satellite image. (B) illustrates that Total Variation deblurring results in severe loss of texture. (C) illustrates a result of the Poisson Singular Integral (PSI) method using substitute Lipschitz data $\alpha=0.417$, $C_{f^*}=0.99$, $t^*=0.1$, obtained from Mariner 5 image in FIG. 3. (D) illustrates unrealizable true Wiener filtering with exact power spectra $|\hat{n}(\xi, \eta)|$, $|\hat{f}_e(\xi, \eta)|$.

TABLE 5

Behavior in strongly defocused USAF satellite image in FIG. 7.

| Deblurring Method | $L^1$ relative error | $L^2$ relative error |
|---|---|---|
| Total Variation (B) | 32.91% | 31.82% |
| PSI based on Mariner 5 data (C) | 20.69% | 16.83% |
| True Wiener Filtering (D) | 17.50% | 13.04% |

While the preferred embodiments of the present invention have been illustrated and described, it will be understood by those skilled in the art that the image processor as described herein is illustrative, and various changes and modifications may be made to the algorithms and equivalents may be substituted for elements thereof, without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the appended claims.

What is claimed is:

1. A method for classifying the smoothness of a noise-free 2J×2J square original image $f(x, y)$, comprising the steps of:
    providing a singular integral operator $S_\lambda^t$;
    choosing $\lambda$ such that $0.5 \leq \lambda \leq 1$;
    based on the provided $S_\lambda^t$, classifying the smoothness of the original image as a Lipschitz space classification in terms of constants and depicting a deblurred image.

2. The method of claim 1, wherein said classifying comprises the steps of:
    forming a forward Fourier Transform of the image $f(x, y)$, denoted by $\hat{f}(\xi, \eta)$;
    providing a fixed finite sequence $\{t_n\}_{n=1}^N$ that tends to zero;
    for at least one predetermined value of p, performing the steps of:
    a. defining an $L^p$ norm of a 2J×2J square image $i(x, y)$ as $$\|i\|_p \equiv \left\{ \sum_{x,y=1}^{2J} |i(x, y)|^p \right\}^{1/p}$$

b. calculating the $L^p$ norm of the original image;
   c. for each n=1, ..., N, plotting as a sequence on a log-log scale the relative error $\mu_p(t_n)$ v. $t_n$ obtained by performing the steps of:
      i. blurring the image in Fourier space using the provided fixed finite sequence element $t_n$,
      ii. obtaining an inverse image by an inverse Fourier transform of the blurred image, and
      iii. subtracting the inverse image from the original image to obtain a difference and dividing a calculated LP norm of the difference by the calculated $L^p$ norm of the original image to obtain the relative error $\mu$
   d. displaying the plotted sequence as a solid curve $A_p$;
   e. identifying the value of $Q_p = \ln t_n$ of the start of a slowly increasing portion towards the end of the displayed curve $A_p$;
   f. finding majorizing lines, $\Sigma A_p$ and $\Gamma A_p$, respectively consisting of a best fit of the slowly increasing portion towards the end of the plotted sequence after $Q_p$, and one that best fits a remaining portion originating at the beginning of the plotted sequence before $Q_p$;
   g. from the two majorizing lines, $\Sigma A_p$ and $\Gamma A_p$, determining Lipschitz space information, $\{\alpha, C\}_p$, that characterizes the smoothness of the blurred image, where $\alpha=2\sigma\lambda$, and $\sigma>0$ is the slope of $\Sigma A_p$ and C is determined by $\ln C$=intercept of line $\Sigma A_p$ on the vertical axis $\ln t=0$.

3. The method of claim 2, wherein:
    the end of the displayed curve $A_p$ in step e. is towards $\ln t_n=0$; and
    the beginning of the plotted sequence before $Q_p$ in step f. is approximately at $\ln t_n=-15$.

4. The method of claim 2, wherein the finding step further comprises the steps of:
for $v_n = \ln \mu_p(t_n)$, $u_n = \ln t_n$ performing the steps of:
for $-15 \leq u_n \leq -12$, using least squares approximation to fit $v_n$ with $cu_n + d$;
defining a line $\Gamma A_p$ to be the straight line $v = cu + d + \epsilon$, with $\epsilon > 0$ chosen so that $\Gamma A_p$ lies slightly above the solid curve A for very small values of t;
for $-6.0 \leq u_n \leq -1.0$, using least square approximation to fit $v_n$ with $\sigma u_n + b$; and
defining the line $\Sigma A_p$ to be the straight line $v = \sigma u + b + \delta$, with $\delta > 0$ chosen so that $\Sigma A_p$ lies slightly above the slowly increasing second portion of the curve $A_p$.

5. The method of claim 4, wherein $\lambda = 0.5$ and p is selected from the group consisting of the numbers 1 and 2.

6. The method of claim 2, wherein:
$\xi$ and $\eta$ are integers and $-J \leq \xi, \eta \leq J$;
the blurring step further comprises the step of for a predetermined value of $\lambda$, forming the function $\hat{g}_\lambda(\xi, \eta, t_n)$ for each $t_n$, where $\hat{g}_\lambda(\xi, \eta, t_n) = e^{-n(\xi_2 + n_2)_\lambda} \hat{f}(\xi, \eta, t_n)$;
the obtaining step further comprises the step of forming the function $\hat{g}_\lambda(\xi, \eta, t_n)$ denoted by $g_\lambda(x, y, t_n)$;
the subtracting step further comprises the step of calculating the difference $$h_n(x, y) = f(x, y) - g_\lambda(x, y, t_n).$$

7. The method of claim 4, wherein:
when $\lambda = 0.5$, $S_\lambda^t = U^t$ is the Poisson singular integral;
when $\lambda = 1.0$, $S_\lambda^t = G^t$ is the Gaussian singular integral;
when $0.5 < \lambda < 1$, $S_\lambda^1$ is a general isotropic Lévy stable singular integrals; and
$t_n = (0.95)^n$, $n = 1, \ldots, 300$.

8. The method of claim 7, wherein the finding step further comprises the steps of:
for $v_n = \ln \mu_p(t_n)$, $u_n = \ln t_n$ performing the steps of:
for $-15 \leq u_n \leq -13$, using least squares approximation to fit $v_n$ with $cu_n + d$;
defining a line $\Gamma A_p$ to be the straight line $v = cu + d + \epsilon$, with $\epsilon > 0$ chosen so that $\Gamma A_p$ lies slightly above the solid curve $A_p$ for very small values of t;
for $-11.5 \leq u_n \leq -1.0$, using least square approximation to fit $v_n$ with $cu_n + b$; and
defining the line $\Sigma A_p$ to be the straight line $v = \sigma u + b + \delta$, with $\delta > 0$ chosen so that $\Sigma A_p$ lies slightly above the slowly increasing second portion of the curve $A_p$.

9. The method of claim 8, wherein $\lambda = 1.0$ and p is selected from the group consisting of the numbers 1 and 2.

10. A method for defining a Singular Integral restoration of a noisy $2J \times 2J$ square original blurred image $g(x, y)$, to an exact sharp image $f(x, y)$, comprising the steps of:
  a. acquiring a-priori Lipschitz space information in the desired sharp image;
  b. constructing a regularizer function in a Fourier transform domain;
  c. calculating a constant from the acquired Lipschitz space information;
  d. composing a deblurred image from the original image using the regularizer function and the calculated constant in the Fourier transform domain;
  e. forming a deblurred image in physical space variables from an inverse Fourier Transform;
  f. displaying the deblurred image; and
  g. generating a plurality of trial reconstructions from the original blurred image by repeating the steps a. through g. while systematically varying the values of $(C, \alpha)$ in the acquiring step thereof;
  h. selecting a best Singular Integral restoration from the plurality of trial reconstructions based on a visual comparison of each of said plurality with at least one predetermined salient feature of the exact sharp image $f_e(x, y)$ and depicting a deblurred image.

11. The method of claim 10, wherein said acquiring step further comprises the steps of:
assuming that the unknown exact sharp image $f_e(x, y)$ belongs to Lipschitz space $\Lambda(\alpha, 2, \infty)$;
acquiring a-priori information $\epsilon$ and M in the blurred image such that $$\|n\|_2 \leq \epsilon, \|f\|_2 \leq M, \epsilon \ll M;$$

choosing $\lambda$ such that $0.5 \leq \lambda \leq 1$ and $0.1 \leq t^*$;
providing a pre-determined value of p=2 and singular integral operator $S_\lambda^t$;
based on the provided p=2 and $S_\lambda^1$, the chosen $\lambda$ and, classifying the smoothness of the original image as a Lipschitz space classification by performing the method of claim 2 to obtain $\alpha < 1$ and C such that $$\|S_\lambda^t f_e - f_e\|_2 \leq C \|f\|_2 t^{\alpha/2\lambda}, 0 < t \leq t^*.$$

12. The method of claim 11, wherein said constructing step further comprises the step of constructing a regularizer $\hat{z}(\xi, \eta, \lambda, t^*)$ by $$\hat{z}(\xi, \eta, \lambda, t^*) = t^* + \left\{ \frac{4e^{-t^*\rho} - e^{-2t^*\rho} - 3}{2\rho} \right\}^{1/2}, -J \leq \xi, \eta \leq J$$

where
$\xi, \eta$ are integers with $-J \leq \xi, \eta \leq J$.
$\rho = (\xi^2 + \eta^2)^\lambda$ and
$0 < t \leq t^*$.

13. The method of claim 12, wherein the calculating step further comprises the step of calculating the positive constant $\Gamma_{t^*}$ by $$\Gamma_{t^*} = \left\{ \frac{1 + 2\delta}{C^2 (t^*)^{1+2\delta}} \right\}^{1/2}, \delta = \alpha/(2\lambda).$$

14. The method of claim 13, wherein the composing step further comprises the steps of:
defining the Fourier domain function $\hat{f}^{SI}(\xi, \eta)$ by means of $$\hat{f}^{SI}(\xi, \eta) = \frac{\overline{\hat{p}(\xi, \eta)} \hat{g}(\xi, \eta)}{|\hat{p}(\xi, \eta)|^2 + (\epsilon/M)^2 \{1 + \Gamma_{t^*}^2 |\hat{z}(\xi, \eta, \lambda, t^*)|^2\}},$$

$-J \leq \xi, \eta \leq J$ where
$\overline{\hat{p}}(\xi, \eta)$ denotes the complex conjugate of $\hat{p}(\xi, \eta)$, and
$\hat{g}(\xi, \eta)$ and $\hat{p}(\xi, \eta)$ are discrete forward Fourier Transforms of $g(x, y)$ and $p(x, y)$ respectively; and
forming the deblurred image $\hat{f}^{SI}(\xi, \eta)$ in physical space by inverse Fourier transforming the defined Fourier domain function $\hat{f}^{SI}(\xi, \eta)$.

15. The method according to claim 1, wherein said depicting comprises printing the deblurred image.

16. The method according to claim 10, wherein said depicting comprises printing the deblurred image.

* * * * *